United States Patent
Jeon et al.

(10) Patent No.: US 11,235,624 B2
(45) Date of Patent: Feb. 1, 2022

(54) TIRE FOR PREVENTING IRREGULAR TREAD WEAR

(71) Applicant: Hankook Tire Co., Ltd., Seoul (KR)

(72) Inventors: Hae In Jeon, Daejeon (KR); Eun Chang Chun, Daejeon (KR); Ha Eun Koog, Seoul (KR)

(73) Assignee: Hankook Tire Co., Ltd., Seoul (KR)

( * ) Notice: Subject to any disclaimer, the term of this patent is extended or adjusted under 35 U.S.C. 154(b) by 52 days.

(21) Appl. No.: 16/350,453

(22) Filed: Nov. 19, 2018

(65) Prior Publication Data

US 2019/0329600 A1 Oct. 31, 2019

(30) Foreign Application Priority Data

Apr. 26, 2018 (KR) .................. 10-2018-0048515

(51) Int. Cl.
*B60C 11/13* (2006.01)

(52) U.S. Cl.
CPC ..... *B60C 11/1323* (2013.01); *B60C 2011/133* (2013.01); *B60C 2011/1338* (2013.01)

(58) Field of Classification Search
CPC ........... B60C 11/1323; B60C 2011/133; B60C 2011/1338
See application file for complete search history.

(56) References Cited

U.S. PATENT DOCUMENTS

2015/0158340 A1* 6/2015 Kaji .................... B60C 11/1307
152/209.21

FOREIGN PATENT DOCUMENTS

| CN | 107074037 A | * | 8/2017 | ............ B60C 11/13 |
| JP | H0717216 A | * | 7/1993 | ............ B60C 11/04 |
| JP | H092026 A | | 1/1997 | |
| JP | 2015171865 | * | 3/2014 | ............ B60C 11/01 |

* cited by examiner

*Primary Examiner* — Matthew J Daniels
*Assistant Examiner* — Shibin Liang
(74) *Attorney, Agent, or Firm* — Novick, Kim & Lee, PLLC; Jae Youn Kim; Jihun Kim

(57) ABSTRACT

A tire includes a reinforcing rib formed on a groove to prevent irregular wear of a tread and including an auxiliary hidden groove formed in the groove to enhance capabilities of water absorption and drainage of the tire even when the reinforcing rib is formed on the groove. The tire can include a reinforcing rib coupled to a first sidewall, which is one of both sidewalls forming the groove, and protruding toward the groove from the first sidewall, a hidden groove formed in one portion of a second sidewall which is the other of the sidewalls forming the groove, and a remaining tread part protruding toward the groove from a side surface of the hidden groove, the remaining tread part being the other portion of the second sidewall.

8 Claims, 2 Drawing Sheets

TIRE FOR PREVENTING IRREGULAR TREAD WEAR

BACKGROUND OF THE INVENTION

Field of the Invention

The present invention relates to a tire for preventing irregular tread wear, and more particularly, to a tire including a reinforcing rib formed on a groove to prevent irregular wear of a tread and including an auxiliary hidden groove formed in the groove to enhance capabilities of water absorption and drainage of the tire even when the reinforcing rib is formed on the groove.

Description of the Related Art

Generally, in order to secure various performances such as drainage performance, braking performance, and heat generation of a heavy-duty pneumatic tire for vehicles, the tread of the pneumatic tire for vehicles has a plurality of grooves and a plurality of blocks divided by the grooves.

In addition, among the important performances of the tire, the capabilities of water absorption on the wet road surface and drainage are increasingly emphasized. Accordingly, there is a need for techniques to maintain or increase the durability of the tire while enhancing these capabilities of water absorption and drainage.

Japanese Patent No. 3539450 (entitled "Heavy-duty Pneumatic Radial Tire) discloses a tire in which a new groove is added to an intermediate rib to form a wide rib and a narrow rib and the narrow rib is formed at the same tread height as the wide rib, thereby preventing tread rubber from moving in the axial direction of the tire while preventing a reduction in effective ground contact area to suppress uneven wear.

CITATION LIST

Patent Literature

Patent Literature 1: Japanese Patent No. 3539450

SUMMARY OF THE INVENTION

The present invention has been made in view of the above-mentioned problem, and an object thereof is to enhance capabilities of water absorption and drainage of a tire while preventing irregular wear of the tire.

The present invention is not limited to the above-mentioned object, and other objects of the present invention can be clearly understood by those skilled in the art to which the present invention pertains from the following description.

To accomplish the object described above, a tire for preventing irregular tread wear, in which a groove is formed on a tread, according to an aspect of the present invention includes a reinforcing rib coupled to a first sidewall, which is one of both sidewalls forming the groove, and protruding toward the groove from the first sidewall, a hidden groove formed in one portion of a second sidewall which is the other of the sidewalls forming the groove, and a remaining tread part protruding toward the groove from a side surface of the hidden groove, the remaining tread part being the other portion of the second sidewall, and the hidden groove provides a channel in which a fluid flows.

In the aspect of the present invention, the reinforcing rib may be in contact with a bottom surface of the groove.

In the aspect of the present invention, the reinforcing rib may have a height ranging from 80 to 90% of the depth of the groove.

In the aspect of the present invention, the hidden groove may have a height lower than the height of the reinforcing rib.

In the aspect of the present invention, the reinforcing rib may have a protruding width ranging from 30 to 70% of the width of the groove.

In the aspect of the present invention, the side surface of the hidden groove may have a slope in a direction away from the reinforcing rib.

In the aspect of the present invention, the reinforcing rib may be formed in plurality and arranged at a predetermined distance.

In the aspect of the present invention, a distance between the reinforcing ribs may be 80 to 100% of the length of the circumferential side of the tire at the contact surface of the first sidewall with the reinforcing ribs.

DETAILED DESCRIPTION OF THE PREFERRED EMBODIMENTS

Figure 1:
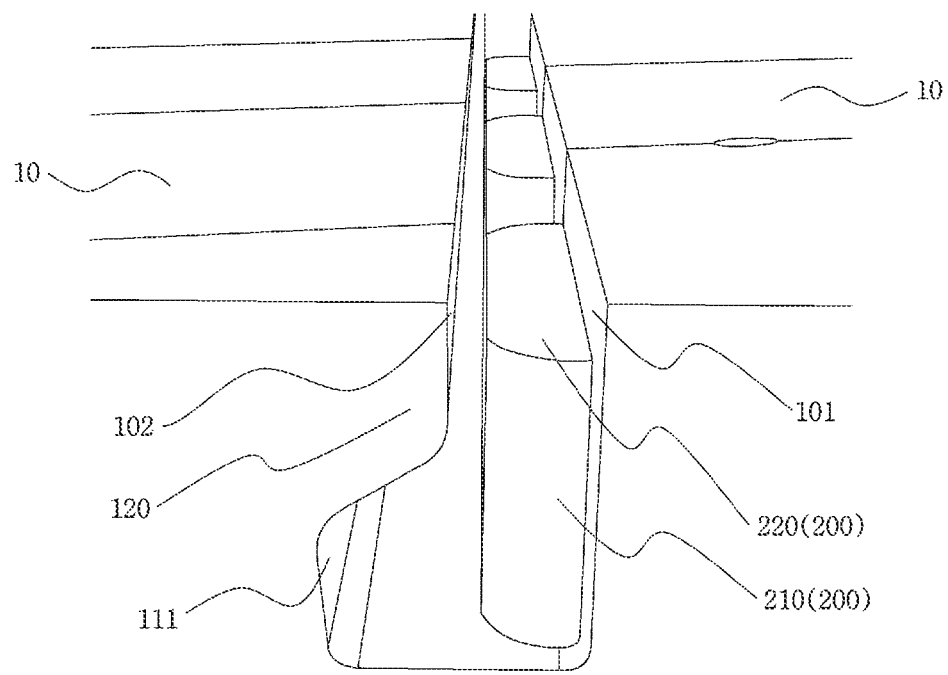
FIG. 1 is a perspective view illustrating a groove and a reinforcing rib according to an embodiment of the present invention.

Reference will now be made in detail to exemplary embodiments of the present invention, examples of which are illustrated in the accompanying drawings. The present invention may, however, be embodied in different forms and should not be construed as limited to the embodiments set forth herein. For clear explanation of the present invention, parts irrelevant to the description may be omitted in the drawings, and like reference numerals refer to like parts throughout the specification.

In the whole specification, it will be understood that when an element is referred to as being "connected (joined, contacted, or coupled)" to another element, it can be "directly connected" to the other element or it can be "indirectly connected" to the other element with other elements being interposed therebetween. In addition, it will be understood that when a component is referred to as "comprising or including" any component, it does not exclude other components, but can further comprise or include the other components unless otherwise specified.

The terminology used in the present disclosure is for the purpose of describing particular embodiments only and is not intended to limit the invention. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, exemplary embodiments of the present invention will be described in detail with reference to the accompanying drawings.

Figure 2:
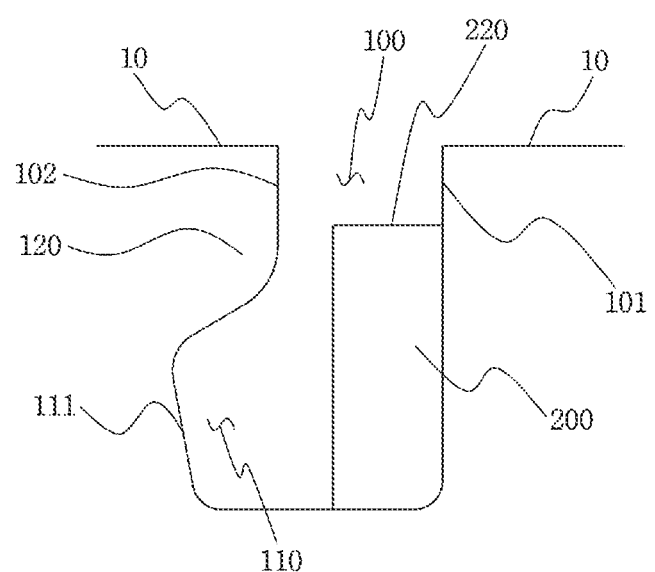
FIG. 2 is a cross-sectional view illustrating the groove and the reinforcing rib according to the embodiment of the present invention.

FIG. 1 is a perspective view illustrating a groove 100 and a reinforcing rib 200 according to an embodiment of the present invention. FIG. 2 is a cross-sectional view illustrating the groove 100 and the reinforcing rib 200 according to the embodiment of the present invention.

As illustrated in FIGS. 1 and 2, a tire, in which a groove 100 is formed on a tread 10, according to the present invention may include a reinforcing rib 100 coupled to a first sidewall 101, which is one of both sidewalls forming the groove 100, and protruding toward the groove 100 from the first sidewall 101, a hidden groove 110 formed in one portion of a second sidewall 102 which is the other of the sidewalls forming the groove 100, and a remaining tread part 120 that is the other portion of the second sidewall 102 and protrudes toward the groove 100 from the side surface 111 of the hidden groove, and the hidden groove 110 may provide a channel, in which a fluid flows, together with the groove 100.

Since the reinforcing rib 200 is restrained by the first sidewall 101, it can absorb breaking force which is a force formed on the tire during braking.

Specifically, the shape of the tire is changed due to an increase in pressure with respect to the ground during the braking, so that the shape of the groove 100 may be changed to reduce the volume of the groove 100. In such a case, the tire of which the shape of the groove 100 is changed may slide against the ground and the tread 10 may be irregularly worn out.

Here, it is possible to reduce a change in the shape of the groove 100 by forming the reinforcing rib 200 in the groove 100 and consequently to prevent the irregular wear of the tread 10. In addition, it is possible to improve the stiffness of the entire tread 10 by the reinforcing rib 200 at the beginning of wear.

The reinforcing rib 200 can disperse driving force, which is a force formed on the tire while a vehicle equipped with the tire is traveling, to induce a uniform wear of the tread 10.

Specifically, the tread 10 may receive a force in various directions due to the switching of the traveling direction of the vehicle or the acceleration or deceleration of the vehicle while the vehicle is traveling. In such a case, the shape of the groove 100 may also be changed in various forms and the tread 10 may be irregularly worn out. Here, it is possible to reduce a change in the shape of the groove 100 by forming the reinforcing rib 200 in the groove 100 and simultaneously to disperse a force concentrated on one portion of the tread 10 and induce a uniform wear of the tread 10 by the reinforcing rib 200 which is formed on the first sidewall 101 forming the groove 100 and is coming into contact with the second sidewall 102 forming the groove 100.

However, in the case where the reinforcing rib 200 is formed in the groove 100, the volume of the groove 100 is reduced and the shape of the groove 100 providing the channel becomes complicated. Hence, the water absorption and drainage performance performed by the groove 100 may be reduced.

To prevent this issue, the tire of the present invention includes the hidden groove 110 formed in the groove 100, thereby increasing the water absorption capacity of the groove 100. Thus, it is possible to enhance the water absorption and drainage performance of the groove 100 while maintaining the effect of the reinforcing rib 200.

When the tire of the present invention is worn out so that the wear rate of the tire is 30 to 50%, the hidden groove 110 may be exposed to the outside. In this case, the hidden groove 110 is included in the groove 100 to perform the function of the groove 100 and the effect of the reinforcing rib 200 is also maintained in the state in which the water absorption capacity of the groove 100 is increased, thereby preventing the irregular wear of the tread 10.

Both sidewalls forming the groove 100 may be formed by blocks. Specifically, the first sidewall 101 may be a side portion of one block and the second sidewall 102 may be a side portion of the other block.

As illustrated in FIG. 1, the reinforcing rib 200 may have a cross-sectional shape in which both sides of two parallel straight lines are connected in a curved form when viewed from the outer peripheral surface of the tire, namely from the outer surface 220 of the reinforcing rib. One straight line, which is in contact with the first sidewall 101, from among the two parallel straight lines may be longer than the other straight line. Thus, the reinforcing rib 200 may have curved surfaces 210 formed on both sides thereof.

Therefore, it is possible to minimize resistance to the fluid passing through the groove 100 even though the reinforcing rib 200 is formed in the groove 100 so that the shape of the channel formed in the groove 100 is curved. The fluid flowing along the groove 100 is subjected to resistance by the curved surfaces 210 of the reinforcing rib 200, but it is possible to minimize the resistance of the curved surfaces 210 acting on the fluid since the curved surfaces 210 have a curved shape.

The reinforcing rib 200 may be formed to be in contact with the bottom surface of the groove 100. Here, the reinforcing rib may have a height B ranging from 80 to 90% of the depth A of the groove. The reinforcing rib may have a protruding width C ranging from 30 to 70% of the width D of the groove.

The reinforcing rib 200 enables the original service life of the tire to be ensured by basically preventing foreign substances such as stones from being caught in the groove 100. By forming the reinforcing rib 200 at the above ratio, it is possible to prevent foreign substances such as stones from being caught in the groove 100.

In addition, since the reinforcing rib 200 is in contact with the bottom surface of the groove 100, it is possible to prevent beforehand an occurrence of cracks in the bottom of the groove 100 where cracks are intensively caused or in the regions where the bottom of the groove 100 meets the sidewalls of the groove 100.

Since the reinforcing rib 200 is formed at the above ratio, effective mutual constraint may occur when the relative movement between the reinforcing rib 200 and the block formed on the tread 10 occurs. Here, it is natural that the first sidewall 101 or the second sidewall 102 is formed by each block.

The hidden groove may have a height E lower than the height B of the reinforcing rib. Here, the height E of the hidden groove may be a vertical length from the tip of the lower end of the remaining tread part 120 to the bottom surface of the groove 100, as illustrated in FIG. 2. The height B of the reinforcing rib may be a length from the outer surface 220 of the reinforcing rib exposed to the outside to the bottom surface of the groove 100.

Accordingly, when the height of the lower end of the remaining tread part 120 is lower than the height of the outer surface 220 of the reinforcing rib and the shape of the groove 100 is changed to reduce the volume of the groove 100, the lower end of the remaining tread part 120 comes into contact with the reinforcing rib 200 so that the progress of the shape change of the groove 100 is suppressed. Therefore, it is possible to prevent the irregular wear of the tread 10.

The reinforcing rib 200 may be formed in plurality and arranged at a predetermined distance. Here, the distance between the reinforcing ribs 200 may be 80 to 100% of the length of the circumferential side of the tire at the contact surface of the first sidewall 101 with the reinforcing ribs 200.

The reinforcing ribs 200 may be formed at the above distance in the circumferential direction of the tire. When the tire runs on a wet road surface or in case of rain, water or rainwater on the wet road surface can be efficiently drained through empty spaces between the groove 100 and the reinforcing ribs 200.

As illustrated in FIG. 2, the side surface 111 of the hidden groove may have a slope in a direction away from the reinforcing rib 200. Thus, the angle formed between the side surface 111 of the hidden groove and the bottom surface of the groove 100 may be an obtuse angle.

When the angle formed between the side surface 111 of the hidden groove and the bottom surface of the groove 100 is an obtuse angle, it is possible to prevent damage due to cracks even though an external force is repeatedly applied to the region where the side surface 111 of the hidden groove meets the bottom surface of the groove 100. In addition, it is possible to enhance the water absorption and drainage performance of the groove 100 and the hidden groove 110 by an increase in volume of the hidden groove 110.

Although the angle formed between the side surface 111 of the hidden groove and the bottom surface of the groove 100 is described as being an obtuse angle in the embodiment of the present invention, the present invention is not necessarily limited thereto. For example, the angle formed between the side surface 111 of the hidden groove and the bottom surface of the groove 100 may be a right angle or an acute angle according to the design of the tire.

The following Table 1 shows the change of the volume of the groove 100 depending on the ratio (30% to 70%) of the protruding width C of the reinforcing rib to the width D of the groove in the state in which other design dimensions are fixed. Here, "Before Application" refers to before the hidden groove 110 is applied and the volume ratio of the groove 100 is set as 100%, whereas "After Application" refers to after the hidden groove 110 is applied and the volume ratio of the groove 100 may be increased compared to 100% before application.

Specifically, if the ratio of the protruding width C of the reinforcing rib to the width D of the groove is 70%, it can be seen that the volume of the groove 100 is increased by 73% after the application of the hidden groove 110 compared to before the application of the hidden groove 110. The other remaining values in Table 1 may be analyzed in the same manner.

TABLE 1

| Ratio (C/D) | Before Application | After Application |
| --- | --- | --- |
| 30 | 100% | 137% |
| 40 | 100% | 147% |
| 50 | 100% | 153% |
| 60 | 100% | 162% |
| 70 | 100% | 173% |

As shown in the analysis of the above Table 1, it can be seen that even though the reinforcing rib 200 is installed to the first sidewall 101 forming the groove 100, the increase in volume of the groove 100 is realized by the hidden groove 110 capable of preventing the water absorption and drainage performance of the groove 100 from deteriorating.

The present invention with the above-mentioned configuration has effects of preventing the irregular wear of the tread by forming the reinforcing rib on the groove and of enhancing the capabilities of water absorption and drainage of the tire by forming the auxiliary hidden groove in the groove even when the reinforcing rib is formed on the groove.

The present invention is not limited to the above effects, and it should be understood that the present invention includes all effects which can be inferred from the detailed description of the present invention or the configuration of the invention defined by the appended claims.

The above-mentioned embodiments of the present invention are merely examples, and it will be understood by those skilled in the art that various modifications may be made without departing from the spirit and scope or essential features of the invention. Therefore, it should be understood that the embodiments described above are for purposes of illustration only in all aspects and are not intended to limit the scope of the present invention. For example, each component described in a single form may be implemented in a distributed form, and similarly, components described in the distributed form may be implemented in a combined form.

The scope of the present invention is defined by the appended claims, and it should be construed that all modifications or variations derived from the meaning, scope, and equivalent concept of the claims fall within the scope of the invention.

What is claimed is:

1. A tire configured for preventing irregular tread wear, the tire comprising:
    a groove formed on a tread;
    a first sidewall and a second sidewall, both of which forming the groove;
    a reinforcing rib coupled to the first sidewall, and protruding toward the groove from the first sidewall;
    a hidden groove formed in a first portion of the second sidewall which is opposite to the first sidewall; and
    a remaining tread part protruding toward the groove from a side surface of the hidden groove, the remaining tread part being a second portion of the second sidewall,
    wherein the hidden groove forms a channel for fluid flow,
    wherein the reinforcing rib has a cross-sectional shape having two parallel straight lines including a first straight line and a second straight line which are directly connected to each other by two opposite curved lines including a first curved line and a second curved line when viewed from an outer peripheral surface of the tire, such that the reinforcing rib has two plan surfaces parallel to each other and two curved surfaces formed on both sides thereof, and
    wherein the first straight line is in contact with the first sidewall and is longer than the second straight line which is parallel to the first sidewall, the first curved line extends directly from a first end of the second straight line to a first end of the first straight line, and the second curved line extends directly from a second end of the second straight line to a second end of the first straight line.

2. The tire according to claim 1, wherein the reinforcing rib is in contact with a bottom surface of the groove.

3. The tire according to claim 2, wherein the reinforcing rib has a height ranging from 80 to 90% of a depth of the groove.

4. The tire according to claim 1, wherein the hidden groove has a height lower than a height of the reinforcing rib.

5. The tire according to claim 1, wherein the reinforcing rib has a protruding width ranging from 30 to 70% of a width of the groove.

6. The tire according to claim 1, wherein the side surface of the hidden groove has a slope in a direction away from the reinforcing rib.

7. The tire according to claim 1, comprising:
   at least two reinforcing ribs arranged at a predetermined distance from one another.

8. The tire according to claim 7, wherein a distance between the reinforcing ribs is 80 to 100% of a length of a circumferential side of the tire at a contact surface of the first sidewall with the reinforcing ribs.

* * * * *